Dec. 4, 1962  F. J. WILSON ETAL  3,066,538
INSTRUMENTS INCLUDING MOVABLE CONDITION-RESPONSIVE ELEMENTS
Filed April 7, 1959  2 Sheets-Sheet 1

Inventors
Frederick J. Wilson
David S. A. Gilliard
By
Pennie, Edmonds, Morton, Barrows & Taylor
Attorneys Dec. 4, 1962     F. J. WILSON ETAL     3,066,538
INSTRUMENTS INCLUDING MOVABLE CONDITION-RESPONSIVE ELEMENTS
Filed April 7, 1959     2 Sheets-Sheet 2
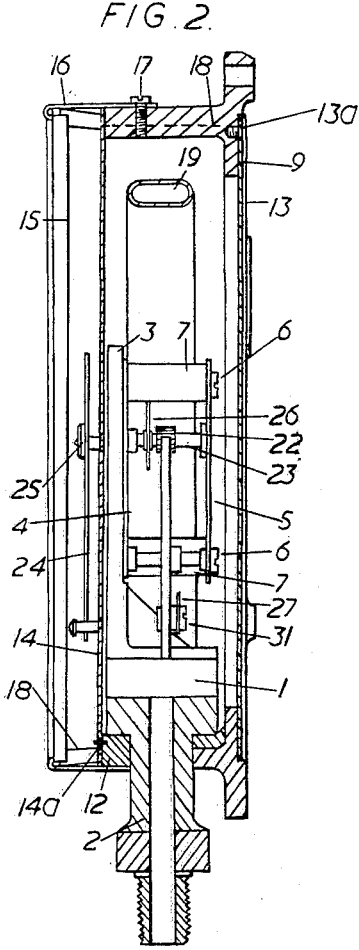
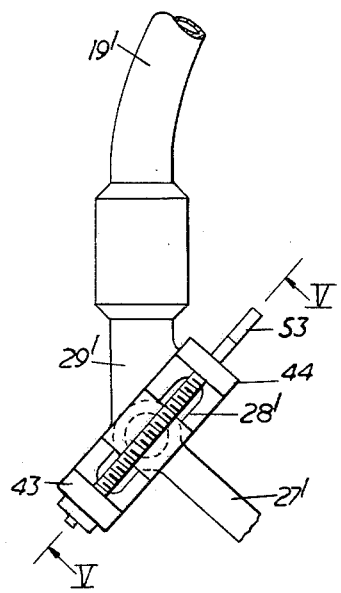
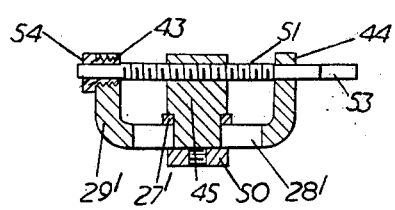
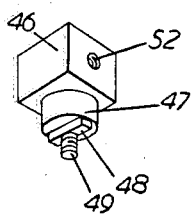

United States Patent Office 3,066,538
Patented Dec. 4, 1962

3,066,538
INSTRUMENTS INCLUDING MOVABLE
CONDITION-RESPONSIVE ELEMENTS
Frederick J. Wilson and David S. A. Gilliard, London, England, assignors to Dewrance & Co. Limited, London, England, a British company
Filed Apr. 7, 1959, Ser. No. 804,691
Claims priority, application Great Britain June 19, 1958
13 Claims. (Cl. 73—415)

This invention relates to instruments of the kind in which changes in a condition produce a physical movement in at least a portion of an element responsive to the condition and in which that movement is used to produce a further effect resulting, for instance, in an indication on a scale of the movement or in a control effected by the movement.

It is generally desirable that the further effect produced by the movement should accurately reflect the change in the condition that caused the movement and this can be achieved by calibrating each instrument separately. Such a procedure is, however, expensive and the trend nowadays is to construct the instruments from components of which all the similar components have been made to the same specification and assume that when the components have been assembled, the application of a given change in the condition will produce the same effect in all the instruments. This assumption is generally roughly justified but, due mainly to the idiosyncracies of some forms of the condition responsive element, the assumption is only approximately true.

It is an object of the invention to provide means whereby instruments made from components in this way can, without the need for individual calibration, be adjusted so that the effect produced by the change in condition more accurately represents the change in the condition.

According to the present invention there is provided an instrument having a condition-responsive element of which the position of at least a portion varies in dependence upon the value of the condition, an instrument movement governed by a pivoted arm, a link pivotally connected at one point to said portion of the condition-responsive element and pivotally connected at another point to the pivoted arm, means for varying the distance between the pivot point of the pivoted arm and the point at which the link is pivotally connected to the pivoted arm, and means for varying the position relatively to said portion of the point at which the link is pivotally connected to said portion, the arrangement being such that when the condition has a first value the disposition of the points about which the link can pivot relatively to the pivoted arm and to said portion can be adjusted so that any displacement, within a range, of the instrument movement can be produced by a given change in the value of the condition from this first value and so that the line joining the pivot point of the pivoted arm to the point at which the link is pivotally connected to the pivoted arm when the point at which the link is pivotally connected to said portion lies mid-way, or substantially mid-way, between the positions of this point when the condition has said first value and when the condition differs from this value by said given change is perpendicular, or substantially perpendicular, to the straight line passing through the position of the point at which the link is pivotally connected to the said portion when the condition has said first value and the position of this point when the condition differs from this value by said given change.

According to the present invention there is also provided an instrument having a condition-responsive element of which a portion moves substantially rectilinearly when the condition changes from a first given value to a second given value, an instrument movement governed by a pivoted arm, a link pivotally connected at one point to the pivoted arm and pivotally connected at another point to said portion of the condition-responsive element, means whereby the position of the point at which the link is connected to the pivoted arm can be adjusted along a locus that is substantially radial of the pivoted arm, means whereby the position of the point at which the link is connected to said portion can be adjusted along a locus relatively to said portion, the arrangement being such that when the portion is in the position which it occupies when the condition has the first given value and the points at which the link is pivotally connected to the pivoted arm and the said portion respectively lie substantially at the mid-points of the loci along which they can be adjusted, then the loci are substantially parallel to each other and the direction of the line connecting the points at which of the link is pivotally connected to the pivoted arm and to said portion lies subsantially in the direction in which said portion moves when the condition changes from the first given value to the second.

The invention is especially advantageously applicable to Bourdon type pressure gauges. The tubes of such gauges made to the same specification and in the same circumstances, are particularly prone to idiosyncratic differences from each other, but it is possible, by means of the present invention, for most of such tubes to be used with acceptable accuracy with the same printed dial.

By way of example, an embodiment of the invention will now be described with reference to the accompanying, partly diagrammatic, drawings in which:

FIGURE 2 is a section on the line II—II of FIGURE 1;

FIGURE 4 is a rear view of an alternative to the detail shown in FIGURE 3;

FIGURE 5 is a section on the line V—V of FIGURE 4; and

FIGURE 6 is a perspective view of a detail of FIGURES 4 and 5.

Figure 1:
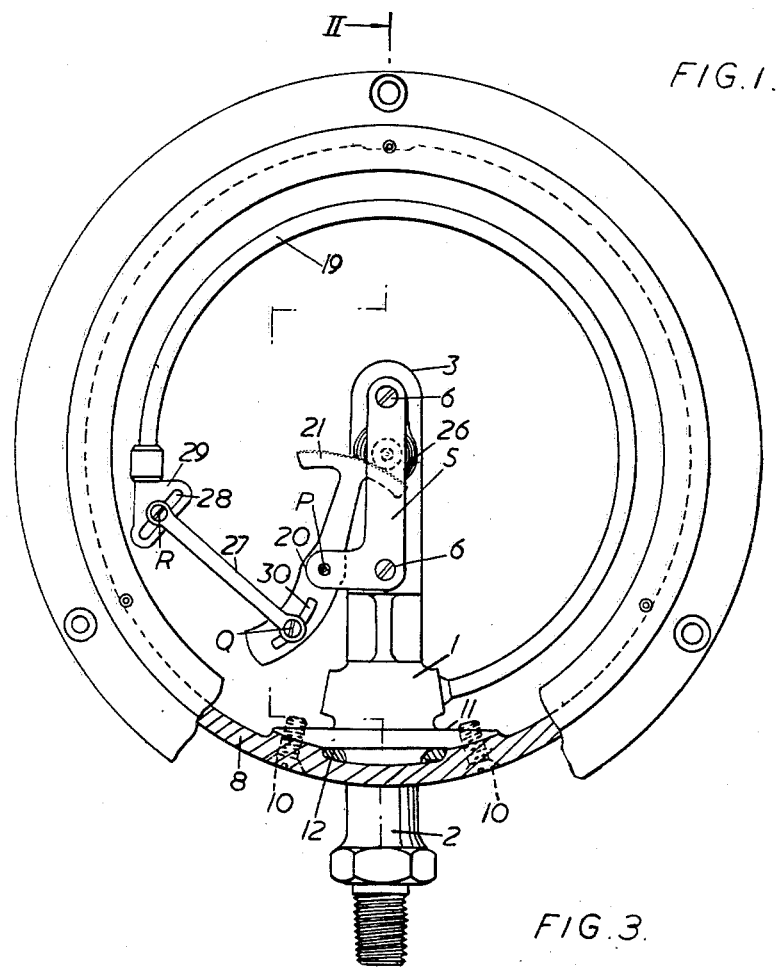
FIGURE 1 is the rear view of a Bourdon type pressure gauge of which the back cover has been removed and which is partly cut away.

The gauge shown in the drawings is mounted on the base block 1 which includes a threaded, bored stem 2, by which it can be connected to a container of which the pressure is to be measured, and a front pillar 3. The L-shaped plates 4 and 5 are connected to the pillar 3 by means of bolts 6 passing through spacers 7.

The casing of the gauge includes the ring 8 having a flange 9 at its rear edge. The stem 2 lies in a recess in the ring 8 opening from the edge opposite to that provided with the flange 9. The ring 8 is held in position relatively to the base block 1 by screws 10 passing through the ring 8 into a cross-member 11 formed on the base block 1. Packing material 12 is provided between the ring 8 and the cross-member 11 to exclude dust. A backing plate 13 is secured to the flange 9 by screws 13a.

A dial 14 printed with equal divisions, each representing the same change in pressure, is located by a pin 14a and secured to the front edge of the ring 8 by screws (not shown) and the front of the gauge is closed by the glass plate 15 held between a flanged band 16 screwed at 17 to the ring 8 and a spacing ring 18 lying between the glass plate 15 and the dial 14.

A pressure tube 19 of oval cross-section, curved so that its axis lies on three-quarters of a circle is connected at one end to the base-block 1 with its interior in communication with the bore in the stem 2.

The movement of the gauge includes the pivoted arm 20, which can swing about the axis P, and of which the front end is provided with a cross rack 21 co-operating with a pinion 22 mounted on an axle 23 so that the rotation of the axle 23 is proportional to the deflection of the arm 20 that produced it. The axle 23 passes through the plates 4 and 5 and carries the pointer 24 which is connected to the axle 23 by means of the cap 25 rigid with the pointer 24 and being a friction fit on the front end of the axle 23. A hair spring 26, anchored at one end, is provided to urge the pointer positively towards a zero position.

The closed end of the pressure tube 19 is connected to the gauge movement by means of the link 27. One end of the link 27 co-operates with a slot 28 in a bracket 29 welded to the closed end of the tube 19 and the other end of the link 28 co-operates with a slot 30 in the tail end of the pivoted arm 20. The slot 30 extends in the general direction of a line passing through the pivot point P.

Figure 3:
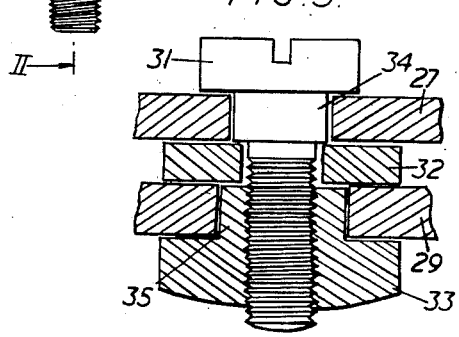
FIGURE 3 is a detail of FIGURE 1.

The connection between the link 27 and the bracket 29 is effected by the pin 31 (see FIGURE 3) passing through the link 27, a washer 32, and the bracket 29 and screwed into the nut 33. When the pin 31 is screwed home, the shoulder 34 on the pin 31 abuts the washer 32 so that the washer 32, the bracket 29, the nut 33 and the pin 31 are clamped together. The width of the link 27 is slightly less than the height of the shoulder 34 so that the link 27 can swing freely on the shoulder 34. The width of the projection 35 on the nut 33 is the same as the internal width of the slot 28 in which it moves and it will be seen that by unscrewing the pin 31 slightly, the pin 31, the link 27, the washer 32 and the nut 33 can be slid to any desired position along the slot 28 and fixed in this position by screwing the pin 31 tightly into the nut 33.

A similar arrangement is used to connect the other end of the link 27 to the tail end of the arm 20 and the axis of the pin 31 in the slot 28 of the bracket 29 is indicated by R.

The radii of curvature of the slots 28 and 30 are each equal to the distance QR between the axes of the pins 31. When the pressure within the tube 19 is the same as the pressure outside it and the axes Q and R lie at the mid-points of the slots 30 and 28 respectively, the centre of curvature of each slot is the mid-point of the other. It will be seen that line QR lies roughly in the same direction as the line joining the ends of the pressure tube 19.

The gauge is set up before the glass cover 15 is fixed in position. To set up the instrument, the link 27 is disposed, when the pressure within the tube is the same as the pressure outside it, so that the axes Q and R lie at the mid-points of the slots 30 and 28 respectively and the pointer 24 is then mounted on the front end of the axle 23 to indicate zero. The pressure difference between the inside and the outside of the tube 19 is then brought to the maximum that the gauge is intended to read and the position of the pin 31 within the slot 30 is adjusted until the pointer 24 accurately indicates this value. The pressure difference is then reduced to half this value and the position of the pin 31 in the slot 28 is adjusted until this value is accurately indicated. It is possible that this adjustment will have slightly affected both the zero and full scale deflections. The pressure difference is therefore reduced to zero and the sequence is repeated. It will usually be found that once the sequence has been repeated, all three pressure differences—zero, full and half—are accurately indicated. Sometimes, however, it may be found that the sequence must be repeated more than once but it will be realised that all the adjustments are easily effected and take very little time.

When the adjustment has been completed as accurately as possible, line PQ will be perpendicular or substantially perpendicular to line QR when the difference between the pressures inside and outside the tube 19 is half the maximum difference that the gauge is intended to indicate. As the difference increases from zero to full, line QR will swing from one side to the other of the position that it occupies when the pressure difference is half the maximum.

The present invention is especially suitable for use with condition-responsive elements, such as that shown in the drawings, which are such that the movement from a zero position of a given point on the element when the condition changes from a zero value by a given amount is substantially directly proportional to that amount. With elements of this sort, the position of the point when the condition has changed from its zero value by half the given amount lies substantially midway between the position of the point at the zero value of the condition and the position of the point when the condition has changed from this value by the given amount.

The invention can, however, also be used with condition-responsive elements in which the movement is not directly proportional to the amount by which the condition changes. When the element is of this sort, the instrument is set up by using a zero value of the condition, the full value of the condition that the instrument is intended to respond to, and a value between these two values which is such that the position of the point at which the link is connected to the condition-responsive element is midway between the positions occupied by this point at zero value of the condition and at full value. When the condition has this intermediate value, the pointer will, of course, be brought to a position in which it indicates this value and not a value lying midway between the zero value and the full value.

An alternative means for connecting the link 27 to the condition-responsive element is shown in FIGURES 4, 5 and 6.

In this arrangement, the bracket 29' that is welded to the end of the pressure responsive tube 19' is provided with a straight slot 28' having an orientation relatively to the end of the tube 19' similar to the orientation of the slot 28 to the tube 19 of FIGURE 1. The edges 43 and 44 of the bracket 29' are turned outwardly at the ends of the slot 28'. A stub 45 passes through the slot 28' and can slide along the slot 28'. The stub 45 consists of the upper cube 46, a short spacer 47, a follower 48, of which the width is slightly less than the width of the slot 28', and a threaded shank 49. The stub 45 is held in the slot 28' by means of the spacer 47 acting on one side of the bracket 29' and a nut 50 screwed on to the shank 49. When the stub 45 is in position, the spacer 47 lies in the hole at the end of the link 27' so that the link 27' can swing freely on the spacer 47.

To control the position of the stub 45 along the slot 28', a threaded shaft 51 co-operates with an internally threaded hole 52 in the cube 46. The unthreaded ends of the shaft 51 are of smaller diameter than the threaded central portion and one, 53, of the ends is shaped to facilitate its being rotated. To bring the shaft 51 into position, the end 53 is passed through a hole in the portion 43, the diameter of the hole being larger than the diameter of the threaded portion of the shaft 51. The shaft 51 is then screwed through the hole 52 in the stub 45 until the end 53 lies in a hole in the portion 44, this hole being of such a diameter that the end 53 can turn freely in it without play. When the shaft 51 is in this position, a bush 54 is screwed into the portion 43, the bush 54 being provided with a hole in which the end of the shaft 51 that lies in it can turn freely without play. Although the ends of the shaft 51 can turn freely in the portions 43 and 44, the shaft 51 is held in position by the fact that its central threaded portion is of larger diameter than either of the ends.

As can be seen, the position of the stub 45 and therefore of the end of the link 27', relative to the slot 28', can be adjusted simply by turning the end 53 of the shaft 51. The thread of the central portion of the shaft 51 is of fine pitch with the result that the position of the stub 45 in the slot 28' can be finely adjusted and once the adjustment has been made it cannot readily be moved accidentally.

A similar arrangement may be used to connect the link 27' to the tail end of an arm 20'. The slit in the tail end of the arm 20' may extend radially of the tail end. When the pressure within the tube 19' is the same as the pressure outside it, and the point about which the link 27' pivots relatively to the tail end lies at the centre of the slit in the tail end, and the point about which the link 27' pivots relatively to the bracket 29' lies at the centre of the slit 28', then the slits are both perpendicular to the line joining the pivot points of the link 27'.

Although only a Bourdon type pressure gauge has been described, it will be realised that the invention is applicable to other instruments in which a movement is produced in a condition-responsive element as a result of changing the condition. For instance, the condition-responsive element may include a bellows, a diaphragm, a capsule, or a bi-metallic strip.

We claim:

1. An instrument having a condition-responsive element including a portion that moves progressively from one position to another as the condition changes from a first value to a second value; an instrument movement; a pivoted arm governing the instrument movement; a link pivotally connected at one point to the pivoted arm and pivotally connected at another point to said portion; means for adjusting the location of the point at which the link is pivotally connected to the pivoted arm to any location within a range lying along a path extending substantially radially relatively to the point about which the pivoted arm pivots; and means for adjusting relatively to said portion the location of the point at which the link is pivotally connected to said portion whereby when said portion lies mid-way between the position which it occupies when the condition has said first value and the position which it occupies when the condition has said second value then, whatever the location within the range of the point at which the link is pivotally connected to the pivoted arm, the location of the point at which the link is pivotally connected to said portion can be brought to be such that the straight line connecting the point about which the pivoted arm pivots to the point at which the link is connected to the pivoted arm is perpendicular to the straight line joining the position occupied by the point at which the link is connected to said portion when the condition has said first value and the position occupied by this point when the condition has said second value.

2. An instrument as set forth in claim 1 in which said link is so disposed that the straight line that passes through the point at which the link is pivotally connected to the pivoted arm and to the portion extends, when the condition has said first value, in the general direction in which the point at which the link is pivotally connected to the portion moves as the condition changes from its first value to its second value; in which said means for adjusting the location of the point at which the link is pivotally connected to the pivoted arm varies said location of the point to any position along an arcuate locus; and in which said means for adjusting relatively to said portion the location of the point at which the link is pivotally connected to said portion varies said location to any position along a further arcuate locus, the radius of curvature of each said loci being equal to the separation between the points at which the link is pivotally connected to the pivoted arm and to the portion, whilst the maximum operation between the loci is equal to the radius of either locus and each locus extends in both directions transversely of the line joining the points at which the loci are most widely separated from each other.

3. An instrument as set forth in claim 1 in which said link is so disposed that the straight line that passes through the point at which the link is pivotally connected to the pivoted arm and to the portion, extends, when the condition has said first value, in the general direction in which the point at which the link is pivotally connected to the portion moves as the condition changes from its first value to its second value; said means for adjusting the location of the point at which the link is pivotally connected to the pivoted arm varies the location in either direction to any position along a straight line that is substantially perpendicular to the direction in which the point at which the link is pivotally connected to said portion moves when the condition changes from its first value to its second value; said means for adjusting relatively to said portion the location of the point at which the link is pivotally connected to said portion varies the location in either direction to any position along a straight line that is substantially parallel to the straight line along which the point at which the link is pivotally connected to the pivoted arm can be adjusted.

4. An instrument having a condition-responsive element including a portion that moves progressively from one position to another as the condition changes from a first value to a second value, the distance between the positions of said portion when the condition has said first value and any value intermediate the first and second values being directly proportional to the difference between said first value and the intermediate value; an instrument movement; a pivoted arm governing the instrument movement; a link pivotally connected at one point to the pivoted arm and at another point to said portion; means for adjusting the location of the point at which the link is pivotally connected to the pivoted arm to any location within a range lying along a path extending substantially radially relatively to the point about which the pivoted arm pivots; and means for adjusting relatively to said portion the location of the point at which the link is pivotally connected to said portion whereby when the condition has a value mid-way between the first and second values then, whatever the location within the range of the point at which the link is pivotally connected to the pivoted arm, the location of the point at which the link is pivotally connected to said portion can be brought to be such that the straight line connecting the point about which the pivoted arm pivots to the point at which the link is pivotally connected to the pivoted arm is perpendicular to the straight line poining the position occupied by the point at which the link is connected to said portion when the condition has said first value and the position occupied by the point when the condition has said second value.

5. An instrument as set forth in claim 4 including a scale having equal divisions marked on an arc of a circle to indicate equal changes in the value of said condition; a pointer having its axis at the center of the circle; said instrument movement determining the position of the pointer in dependence upon changes in the position of said portion so that the angle between the position of the pointer when the condition has said first value and the position when the condition has a third value midway between the first and second values is equal to the angle between the position of the pointer when the condition has said third value and the position when the condition has said second value; said link rocks said pivoted arm in dependence upon the movement of said portion; and said means for adjusting relatively to said portion the location of the point at which the link is pivotally connected to said portion adjusts the location of the point to any position along a path that extends generally parallel to the path that extends generally radially of the point about which said pivoted arm pivots.

6. A Bourdon type pressure gauge including a curved pressure tube rigidly fixed at one end and including a portion of which the position is determined by the differences between the pressure inside the tube and the pressure outside the tube and which moves from a first position when the pressure difference has a first value to a second position when the pressure difference has a second value; an instrument movement; a pivoted arm governing the instrument movement; a link pivotally connected at one point to the pivoted arm and pivotally connected at another point to said portion; means for adjusting the location of the point at which the link is pivotally connected to the pivoted arm to any location within a range lying along a path extending substantially radially relatively to the point about which the pivoted arm pivots; and means for adjusting relatively to said portion the location of the point at which the link is pivotally connected to said portion whereby when said portion lies mid-way between the position which it occupies when the pressure difference has said first value and the position which it occupies when the pressure difference has said second value then, whatever the location within the range of the point at which the link is pivotally connected to the pivoted arm, the location of the point at which the link is pivotally connected to said portion can be brought to be such that the straight line connecting the point about which the pivoted arm pivots to the point at which the link is pivotally connected to the pivoted arm is perpendicular to the straight line joining the position occupied by the point at which the link is pivotally connected to said portion when the pressure difference has said first value and the position occupied by this point when the pressure difference has said second value.

7. A Bourdon type pressure gauge as claimed in claim 6, in which the straight line passing through the point at which the link is pivotally connected to the pivoted arm and the point at which the link is pivotally connected to said portion extends, when the pressure difference has said first value, substantially in the direction in which the point at which the link is pivotally connected to said portion moves as the pressure difference changes from the first value to the second value.

8. A Bourdon type pressure gauge including a pressure tube rigidly fixed at one end and extending round a major arc of a circle; a member rigidly connected to the free end of the pressure tube; an instrument movement; a pivoted arm governing the instrument movement and intersecting the straight line joining the ends of the pressure tube; a link pivotally connected at one point to the pivoted arm and pivotally connected at another point to said member so that the straight line connecting these points extends generally in the direction in which the member moves as a result of variations in the difference between the pressure inside the tube and the pressure outside the tube; means for adjusting the location of the point at which the link is pivotally connected to the pivoted arm to any position along a locus extending substantially perpendicular to the straight line joining the ends of the pressure tube; and means for adjusting the location of the point at which the link is pivotally connected to the member to any position along a locus substantially parallel to said locus whereby, when said member lies midway between the position which it occupies when the pressure inside said tube has a first value and the position which it occupies when the pressure inside the tube has a second value then, whatever the location within the range of the point at which the link is pivotally connected to the pivoted arm, the location of the point at which the link is pivotally connected to said member can be brought to be such that the straight line connecting the point about which the pivoted arm pivots to the point at which the link is pivotally connected to the pivoted arm is perpendicular to the straight line joining the position occupied by the point at which the link is pivotally connected to said member when the pressure has said first value and position occupied by this point when the pressure has said second value.

9. A Bourdon type pressure gauge as claimed in claim 8 in which the pivoted arm approximately intersects the straight line joining the ends of the pressure tube.

10. A Bourdon type pressure gauge including a curved pressure tube rigidly fixed at one end and including a portion of which the position is determined by the difference between the pressure inside the tube and the pressure outside the tube and which moves from a first position when the pressure difference has a first value to a second position when the pressure difference has a second value; an instrument movement; a pivoted arm governing the instrument movement; a link pivotally connected at one point to the pivoted arm and pivotally connected at another point to said portion so that the straight line passing through these points extends generally in the direction in which the point at which the link is pivotally connected to the portion moves as the pressure difference changes from the first value to the second value; and means enabling the inclination of said straight line relatively to said direction to be varied, said means including means whereby the location of the point at which the link is pivotally connected to the pivoted arm can be varied to any position along a first locus extending substantially radially of the point about which the pivoted arm pivots and means whereby the location of the point at which the link is pivotally connected to said portion can be varied to any position along a further locus extending substantially parallel to said first locus whereby, when said portion lies midway between the position which it occupies when the pressure difference has said first value and the position which it occupies when the pressure difference has said second value, then whatever the location within the range of the point at which the link is pivotally connected to the pivoted arm, the location of the point at which the link is pivotally connected to said portion can be brought to be such that the straight line connecting the point about which the pivoted arm pivots to the point at which the link is pivotally connected to the pivoted arm is perpendicular to the straight line joining the position occupied by the point at which the link is pivotally connected to said portion when the pressure difference has said first value and the position occupied by this point when the pressure difference has said second value.

11. In an instrument including a condition-responsive element including a portion that moves progressively from one position to another as the condition changes from a first value to a second value, an instrument movement, and a pivoted arm connected to and controlling the reading indicated by the instrument movement, the improvement comprising a link, means pivotally connecting the link at a first point to said pivoted arm, the location of the point being adjustable to any position along a first path extending generally lengthwise of the arm, means pivotally connecting the link at a second point to said portion of the condition-responsive element, the location of the second point being adjustable along a second path that is a reflection of said first path whereby, when said portion lies midway between the position which it occupies when the pressure difference has said first value and the position which it occupies when the pressure difference has said second value, then whatever the location within the range of the point at which the link is pivotally connected to the pivoted arm, the location of the point at which the link is pivotally connected to said portion can be brought to be such that the straight line connecting the point about which the pivoted arm pivots to the point at which the link is pivotally connected to the pivoted arm is perpendicular to the straight line joining the position occupied by the point at which the link is pivotally connected to said portion when the pressure difference has said first value and the position occupied by this point when the pressure difference has said second value.

12. An instrument as set forth in claim 11 in which the link is a bar, said pivoted connections being at the end portions thereof, the paths extending generally transversely of the longitudinal axis of the bar.

13. An instrument as set forth in claim 12 in which said paths are curved, the radius of curvature of said paths being equal to the distance between the pivot points of said bar.

References Cited in the file of this patent

UNITED STATES PATENTS

| | | |
|---|---|---|
| 1,835,044 | Heise | Dec. 8, 1931 |
| 2,347,341 | Rourke | Apr. 25, 1944 |
| 2,908,184 | Matchett | Oct. 13, 1959 |